United States Patent [19]

Light, Jr. et al.

[11] Patent Number: 4,859,760
[45] Date of Patent: Aug. 22, 1989

[54] POLYURETHANE POWDER COATING COMPOSITIONS

[75] Inventors: Fred W. Light, Jr.; James D. Hood, both of Charlotte, N.C.; Yeong-Ho Chang, Kingsport, Tenn.

[73] Assignee: Eastman Kodak Company, Rochester, N.Y.

[21] Appl. No.: 129,514

[22] Filed: Dec. 7, 1987

[51] Int. Cl.$^4$ .............................................. C08G 18/30
[52] U.S. Cl. .................................. 528/45; 528/272; 528/288; 528/302; 528/308; 528/308.7; 525/440; 525/454; 428/423.1; 428/430; 428/458; 428/480

[58] Field of Search ............................... 525/440, 454; 428/423.1, 430, 458, 480; 528/45, 288, 272, 302, 308, 308.7

[56] References Cited

U.S. PATENT DOCUMENTS

| | | | |
|---|---|---|---|
| 4,012,363 | 3/1977 | Bruning et al. | 260/75 R |
| 4,054,681 | 10/1977 | Bruning et al. | 427/27 |
| 4,340,519 | 7/1982 | Kotera et al. | 524/376 |
| 4,352,924 | 10/1982 | Wooten et al. | 528/302 |
| 4,387,214 | 6/1983 | Passmore et al. | 528/296 |
| 4,442,270 | 4/1984 | Passmore et al. | 525/440 |

FOREIGN PATENT DOCUMENTS

| | | |
|---|---|---|
| 0218040 | 4/1987 | European Pat. Off. |
| 62-240368 | 10/1987 | Japan |
| 2181104 | 4/1987 | United Kingdom |

*Primary Examiner*—John Kight
*Assistant Examiner*—S. A. Acquah
*Attorney, Agent, or Firm*—John F. Stevens; William P. Heath, Jr.

[57] ABSTRACT

Disclosed are polyurethane powder coating compositions comprising at least one amorphous polyester, at least one semi-crystalline polyester, and a polyisocyanate crosslinking agent. Coatings made from such powder compositions provide a unique combination of good hardness and flexibility, while the powder from which they are made has good storage stability.

13 Claims, No Drawings

POLYURETHANE POWDER COATING COMPOSITIONS

TECHNICAL FIELD

This invention relates to thermosetting polyurethane powder coating compositions comprising a polyisocyanate, a semi-crystalline polyester and an amorphous polyester. The powder coating compositions according to this invention may be applied to substrates by methods known in the art, e.g., electrostatic coating, followed by heat-curing tot crosslink the polymer. The compositions according to this invention have a unique balance of propeties in that coatings made from them have good hardness and flexibility, while the powder from which the coatings are made has good storage stability.

BACKGROUND OF THE INVENTION

Storage stability is a requirement for powder coating compositions. If the compositions lack storage stability, the powder is likely to agglomerate (such as by caking or lumping). Agglomeration of the particles of powder is extremely undesirable and leads to problems in application of the powder to a substrate.

Amorphous polymer resins used for powder coatings require a glass transition temperature (Tg) of higher than 40° C. and preferably higher than 55° C. so that the powders made from such resins are storage stable. Coatings resulting from such resins have adequate hardness but limited flexibility as a result of the Tg of the resin.

Semi-crystalline polyesters with Tg lower than 55° C. are known for use in powder coatings or adhesives and are the subject of several patents. This permits the use of resins of much lower Tg than 55° C. and yet crystallinity provides storage stability. These resins have lower melt viscosity at curing temperature than their amorphous counterparts. Coatings from such resins have good flow, good adhesion, and are smooth and flexible. Films rsulting from these resins, however, are usually soft as a result of their low Tg.

U.S. Pat. No. 4,352,924 describes semi-crystalline polyesters derived from dimethyl trans-1, 4-cyclohexanedicarboxylate (DMCD) and 1,4-butanediol, and their utility as resins for powder coatings.

U.S. Pat. Nos. 4,442,270 and 4,387,214 describe semi-crystalline copolyesters derived from terephthalic acid and 1,6-hexanediol for use in primers or overcoatings for automobiles.

U.S. Pat. No. 4,4,012,363 describes semi-crystalline polyesters derived from terephthalic acid and 1,4-butanediol, and its use as thermoplastic powder coatings.

Japanese Patent No. JP 190,919 describes a composite thermoplastic resin layer comprising (a) a crystalline polyester derived from terephthalic acid and ethylene glycol and (b) a copolyester of terephthalic acid, isophthalic acid and ethylene glycol and 1,4-butanediol. The layer is applied as a pre-formed laminate.

We are not aware of any prior art relating to blends of amorphous polyesters and semi-crystalline polyesters for use in thermosetting powder coatings which achieve novel film properties such as those described herein.

DESCRIPTION OF THE INVENTION

According to the present invention, there are provided polyurethane powder coating compositions comprising (a) about 10–80 weight % of at least one amorphous polyester containing free hydroxyl groups and having a Tg of greater than 40° C., a hydroxyl number of about 20–200, and an inherent viscosity of about 0.1–0.5, (b) about 10–80 weight % of at least one semi-crystalline polyester containing free hydroxyl groups and having a Tg of about −10 to about 50° C., a number average molecular weight of about 500–10,000, a heat of fusion of greater than 5 calories per gram—°C., a hydroxyl number of about 20–200, an inherent viscosity of about 0.1–0.5, and (c) about 5–30 weight % of a polyisocyanate crosslinking agent.

the sum of (a), (b) and (c) being 100%.

Of course, the compositions may, and desirably do contain ingredients in addition to (a), (b) and (c) as will be discussed hereinafter.

Both the amorphous and semi-crystalline polyesters described above are produced using conventional, well-known polycondensation processes, using an excess of glycol(s) to result in the desired hydroxyl number. Conventional acids and glycols may be used.

The term 'amorphous polyester' broadly defines polyesters which show no, or trace crystallization or melting point as determined by differential scanning thermometry (DSC). The term 'semi-crystalline polyester' broadly defines polyesters with a discernable crystallization or melting point by DSC.

The glycol component of the polyesters may include aliphatic, alicycli, or aralkyl glycols. Examples of these glycols include ethylene glycol; propylene glycol; 1,3-propanediol; 2,4-dimethyl-2-ethylhexane-1,3-diol; 2,2-dimethyl-11,3-propanediol; 2-ethyl-2-butyl-1,3-propanediol; 2-ethyl-2-isobutyl-1,3-propanediol; 1,3-butanediol, 1,4-butanediol; neopentyl glycol; 1,5-pentanediol; 1,6-nexanediol; 1,8-octanedol; 2,2,4-trimethyl-1,6-hexanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol p-xylylenedio; and trimethylolpropane. Copolymers may be prepared from two or more of the above glycols.

The dicarboxylic acid component of the polyesters comprises aliphatic dicarboxylic acid, alicyclic dicarboxylic acids, aromatic dicarboxylic acids, or mixtures of two or more of these acids. Examples of such dicarboxylic acids include succinic; glutaric; adipic; azelaic; sebacic; fumaric; maleic; itaconic; 1,4-cyclohexanedicarboxylic; phthalic; terephthalic, isophthalic, and naphthalene dicarboxylic acid. It should be understood that use of the corresponding acid anhydrides, esters, and acid chlorides of these acids is included in the term "dicarboxylic acid".

Particularly useful amorphous polyesters include those derived from terephthalic acid, neopentyl glycol and trimethylolpropane. Specific examples of useful commercially available amorphous polyesters are Cargill 3000 resin and Rucote 105.

Particularly useful semi-crystalline polyesters include those derived from terephthalic acid, 1,5-pentanediol and neopentyl glycol; from terephthalic acid, 1,6-hexanediol and neopentyl glycol; from terephthalic acid, 1,10-decanediol and neopentyl glycol; from terephthalic acid, 1,12-dodecanediol and neopentyl glycol, or from dimethyl 1,4-cyclohexanedicarboxylate and a combination of diol, such as 1,4-butanediol, 1,6-hexanediol, 1,10-decanediol or 1,12-dodecanediol.

The amorphous polyester has a Tg of greater than 40° C., preferably greater than 55° C. The semi-crystalline polyester has a Tg of −10 to 50° C., preferably −10 to about 30° C., and a number average molecular weight (Mn) ofa bout 500 to about 10,000, preferably about 1,000 to about 6,000. The semi-crystalline polyester further has a melting point (Tm) of about 70°–200° C., prferably about 80°–140° C., and a heat of fusion (ΔHf, on melting at second heating cycle of DSC) of greater than 5 cal/g—°C., preferably greater than 8 cal/g—°C. Both the amorphous and the semi-crystalline polyesters have hydroxyl numbers of about 20–200, preferably about 30–80, an acid number of 20 or less and an inherent viscosity (I.V.) of about 0.1–0.5, preferably about 0.15–0.30.

The ratio of amorphous to semi-crystalline polyester is adjustable based on the characteristics of each polyester component, crosslinking agent, pigment loading and specific objectives of the coating desired.

The blocked crosslinking agents are well known and commercially available. They are reactive with the hydroxyl groups on the polyester, and crosslink the polymer at these sites. Generally, weight ratio of the combined weight of amorphous polyester and semi-crystalline polyester to crosslinking agent varies froma bou 75/30 to about 95/5 (combined weight of polyesters/crosslinking agent). The crosslinking agents are blocked to prevent their premature reaction. Under predetermined conditions, i.e., sufficient heat, they become unblocked to react with the hydroxyl-terminated polyesters. This term and mechanism are well known in the art.

Examples for crosslinking agents include those based on isophorone diisocyanate blocked with E-caprolactam such as Huls 1530 or Cargill 2400, both commercially available, or those based on toluene 2,4-diisocyanate blocked with E-caprolactam, such as Cargill 2450 crosslinker.

Additives commonly used in powder coatings may be used in the compositions of the present invention. Examples are benzoin, used to reduce entraped air or volatiles, flow aids such as commercial Modaflow III, andn colorants (pigments or dye) such as titanium dioxide.

In general, the powder coating compositions of this invention are produced by melt-blending the ingredients and reducing the solidified material into a fine powder of a size of about 10 to about 125 microns. The ingredients may be preblended if desired. The particles are normally an intimate mixture of the components. Melt blending is carried out at temperatures low enough to prevent the blocked polyisocyanate from becoming unblocked and thus prematurely causing crosslinking to occur.

The powder compositions according to this invention are used in conventional manner by applying a coating thereof to a substrate, followed by heating the coated substrate to a temperature for sufficient time to allow the coating to flow out and crosslink.

Although it is possible to cure or crosslink the powder coating without the use of catalysts, it is usually desirable to use a conventional catalyst, in conventional amounts, to aid in crosslinking the polyisocyanate with the polyesters. Suitable catalysts include organo tin catalysts such as dibutyltin dilaurate, dibutyl tin oxide, stannous octoate, etc. They are generally used in amounts of less than 10 weight % of the composition.

This invention provides thermosetting powder coating compositions which have a combination of good storage stability, good film hardness and excellent film flexibility. In general, the powder passes storage at 40° C. for 10 days (40° C./10 days) storage tests and the resulting films pass 'zero-T bend', a test in which the test panel is bent back to itself or 'zero-thickness' followed by subjection to 93° C. (200° F.) temperature for 20 minutes (200° F./20 minutes) dry heat. The films according to this invention maintain toughness and yet have excellent flexibility.

Films derived from amorphous polyester alone have adequate hardness but fail the 'zero-T bend' test. The films derived from the semi-crystalline polyester alone pass 'zero-T bend' test but are soft.

The inherent viscosities (I.V.) are determined in phenol/tetrachloroethane (60/40 by weight) at a concentration of 0.5 g/100 mL at 25° C. and are reported in dl/g.

The melt viscosities of resins are determined using an ICI melt viscometer at 200° C. (ASTM 4287-83).

The acid number and hydroxyl number are determined by titration and are reported as mg of KOH consumed for each gram of resin.

The glass transition temperature (Tg), crystallization temperature on heating (Tch), temperature on cooling (Tcc) and melting temperature (Tm) are determined by differential scanning calorimetry (DSC) on the second heating cycle at a scanning rate of 20° C./minute after the sample has been heated to melt and quenched to below the resin Tg. Tg values are reported as midpoint of the transition and the Tch and Tm at peaks of transitions.

The weight average molecular weight (Mw) and number average molecular weight (Mn) are determined by gel permeation chrommatography (GPC, or size exclusion chromatography) in tetrahydrofurane (THF) using polystyrene standard and a UV detector.

Impact strengths are determined by using a Gardner Laboratory, Inc., impact tester according to ASTM D2794-84. A weight with a 5/8-inch diameter hemispherical nose is dropped within a slide tube from a specified height to drive into the front (coated face) or back of the panel. The highest impact which does not crack the coating is recorded in inch-pounds, front and reverse.

The pencil hardness of a coating is that of the hardest that will not cut into the coating according to ASTM 3363-74 (reapproved 1980). The results are expressed according to the following scale: (softest) 6B, 5B, 4B, 3B, 2B, B, HB, F, H, 2H, 3H, 4H, 5H, 6H (hardest).

The conical mandrel test is performed by bending the panel over 15 seconds using a Gardner Laboratory, Inc., conical mandrel of specified size according to ASTM-522-85. A pass or fail is recorded.

The 20 and 60 degree gloss are measured using a gloss meter (Gardner Laboratory, Inc., Model GC-9095) according ASTM D-523-85.

The 'zero-T bend' test is performed by bending the panels back to themselves with no thickness between the two halves using a hydraulic jack pressurized to 20,000 pound per square inch (psi). The panel is inspected for crack or poppipng at the bend, before or after heating the panel in a 200° F. (93° C.) forced air oven for 20 minutes (dry heat). Any cracking or popping at the bend is rated fail.

The "heat of fusion," ΔHf, of polymers is the amount of heat absorbed when crystallized polymers are melted. ΔHf values are readily obtained using Differential Scanning Calorimeters (Perkin-Elmer). For example, one method for determining ΔHf is described in Journal of Applied Polymer Science, 20 1209 (1976). Measurement of ΔHf is also described in duPont Thermal Analysis Bulletin No. 900-8 (1965). Qualitatively, the degree of crystallinity of polymers is compared by comparing their ΔHf values.

The caking test is performed by placing approximately 100 mL of powder in a 27-mm diameter capped glass jar which is then placed in a 40° C. environment for 10 days. The powder is examined for loss of free-flowing properties each day. If the powder is still free-flowing at the end of 10 days, it is considered to have passed the text.

The following examples are submitted for a better understanding of the invention.

In the examples, the amorphous polyesters are described as follows:

| Polyester X | |
|---|---|
| terephthalic acid | 100 mol % |
| neopentyl glycol | 91.5 mol % |
| trimethylolpropane | 8.5 mol % |
| $Tg = 64°$ C.; OH No. = 60; I.V. = 0.18 | |
| Polyester Y | |
| terephthalic acid | 90 mol % |
| isophthalic acid | 10 mol % |
| neopentyl glycol | 85 mol % |
| 1,4-cyclohexanedimethanol | 10 mol % |
| trimethylolpropane | 5 mol % |
| $Tg = 56°$ C.; OH No. = 49; I.V. = 0.19 | |
| Polyester Z | |
| terephthalic acid | 85 mol % |
| adipic acid | 5 mol % |
| isophthalic acid | 10 mol % |
| neopentyl glycol | 97 mol % |
| trimethylolpropane | 3 mol % |
| $Tg = 51°$ C.; OH No. = 42; I.V. = 0.21 | |

Examples 1.a., 2.a. and 3.a. describe preparation of semi-crystalline Polyesters 1.a., 2.a. andn 3.a respectively. Examples 1.b., 2.b. and 3.b are controls and describe powder coatings made from these semi-crystalline polyesters (omitting amorphous components). Examples 1.c., 2.c. and 3.c illustrate powder coatings according to this invention using semi-crystalline Polyesters 1.a., 2.a. and 3.a. respectively and the amorphous Polyester X described above.

EXAMPLE 1.a. Semi-Crystalline Resin Synthesis

To a 5-1, 3-neck round bottom flask, terephthalic acid, (1114.8 g, 6.71 mol), neopentyl glycol, (187.4 g, 1.8 mol), 1,10-decanediol, (939.4 g, 5.4 mol) and dibutyltin oxide (2.3 g) are added. The flask is purged with nitrogen and heated to 190° C. over 1.5 hours. The batch is maintained at 190° C. until 15–20% of theoretical condensate has evolved, at which time the batch temperature is increased to and maintained at 230° C. until resin acid number is below 10 mg KOH/g resin. The molten resin is poured to a syrup can where it cools to a white solid with the following properties:

I.V.=0.25 dl/g
ICI Melt Viscosity at 200° C.=6 poise
OH Number=50 (calculated)
Acid Number=5
DSC (2nd cycle)
  Tg=3° C.
  Tch=6° C.
  Tm=106° C.:ΔHf 10.9 cal/g—°C.
Cool Cycle
  Tcc 60° C.
Mw=11,008
Mn=2,710

EXAMPLE 1.b.

Powder Coating From Semi-Crystalline (Control) Polyester of Example 1.a.

Polyester resin from Example 1.a. (1260 g), caprolactam blocked isophorone diisocyanate, (Cargill 2400, 240 g), benzoin (7.5 g), dibutyltin dilaurate (15.0 g), titanium dioxide (600 g) and flow control agent (15.0 g) are mixed in a Hemschel high speed mixer for 15–30 seconds and compounded in a Buss extruder with an 11D barrel design. The extruder temperature profile is zone 1=150° C., zone 2=100° C., zone 3=80° C. and die head 93° C. The molten extrudate is passed through chill rolls to yield a friable product. The product is then ground using a Bantam mill with liquid nitrogen bled into the grinding chamber. The powder is classified through a 200 mesh screen on an Alpine sieve. The powder is electrostatically applied to 3 in.×9 in. metal panels which are cured in a 350° C. oven for 20 minutes. The film properties are as follows:

Impact Strength (in.-lb)
  Fron:>160
  Reverse:>160
Pencil Hardness:HB
⅛ in. Conical Mandrel:Pass
Gloss
  60:87
  20:76
Zero-T Bend:Pass
Zero-T Bend:Dry Heat; Pass
Cake Test (Powder at 40° C.):Pass

EXAMPLE 1.c.

Powder Coating Derived From 20 Parts Polyester of Example 1.a. and 80 Parts Amorphous Polyester X Polyester 1.a. (68.8 g), Polyester X (265.6 g), caprolactam blocked isophrone diisocyanate, (Cargill 2400, 65.6 g), dibutyltin dilaurate (4.0 g), benzoin (2.0 g), flow control agent (4.0 g), titaniun dioxide (160.0 g) are mixed, ground and coated as described in 1.b. except the compounding is made in a Banbury mixer. The films have the following properties:

Impact Strengtth (in.-lb)
  Front:>160
  Reverse:>160
Pencil Hardness:2H
⅛ in. Conical Mandrel:Pass
Gloss
  60:96
  20:85
Zero-T Bend:Pass
Zero-T Bend, Dry Heat:Pass
Cake Test (Powder@40° C.):Pass Example 1 illustrates the synergistic effects of blending amorphous and semi-crystalline polyesters to achieve a balance of hardness and flexibility.

EXAMPLE 2.a.

Semi-Crystalline Resin Synthesis

To a 5-1, 3-neck round bottom flask terephthalic acid (1300.6 g, 7.83 mol), neopentyl glycol (132.1 g, 1.27 mol), 1,6-hexanediol (849.1 g, 7.19 mol) and dibutyltin oxide (2.3 g, 9.2 mol) are added and reacted using procedure similar to example 1.a. The resin has the following properties:

I.V.=0.31 dl/g
ICI Melt Viscosity at 200° C.=19 poise
Acid Number=8
OH Number=45 (calculated)
DSC (2nd cycle)
    $T_g$=10° C.
    $T_{ch}$=43° C.:$\Delta H_f$=8.0 cal/g—°C.
    $T_m$=126° C.
Cool Cycle
    $T_{cc}$ 73° C.
GPC
    Mw:14,800
    Mn:3,819

EXAMPLE 2.b.

Powder Coating From Semi-Crystalline (Control) Polyester of Example 2.a.

Polyester 2.a (332 g), caprolactam blocked isophorone diisocyanate (Cargill 2400, 68 g), benzoin (2.0 g), dibutyltin dilaurate (4.0 g), titanium dioxide (160 g) and flow control agent (4.0 g) are mixed and compounded in a Banbury mixer to a maximum temperature of 80° C. The compounded dough-like mixture is cooled, ground and applied by procedure similar to 1.b. The film properties are as follows:

Impact Strength (in.-lb)
    Front:>160
    Reverse:>160
Pencil Hardness:H
⅛ in. Conical Mandrel:Pass
Gloss
    60:89
    20:64
Zero-T Bend:Pass
Zero-T Bend, Dry Heat:Pass
Cake Test (Powder@40° C.):Pass

EXAMPLE 2.c.

Powder Coating From 40 Parts SemiCrystalline Polyester of Example 2.a. and 60 Parts Amorphous Polyester X Polyester 2.a. (132.8 g), Polyester X (196.8 g), and caprolactam blocked isophorone diisocyanate (Cargill 400, 70.4 g), benzoin (2.0 g), dibutyltin dilaurate (4 g), titanium dioxide (160 g) and flow control agent (4 g) are compounded, ground and coated as described in Example 2.b. The film properties are as follows:

Impact Strength (in.-lb)
    Front:>160
    Reverse:>160
Pencil Hardness:2H
⅛ in. Conical Mandrel:Pass
Gloss
    60:91
    20:71
Zero-T Bend:Pass
Zero-T Bend, Dry Heat:Pass
Cake Test (Powder@40° C.):Pass Example 2 illustrates the synergistic effects of blending the amorphous and semi-crystalline polyester to achieve a balance of hardness and flexibility.

EXAMPLE 3.a.

Semi-Crystalline Resin Synthesis

Terephthalic acid (316.54 g, 1.905 mol), 1,12-dodecanediol (275.64 g, 1.362 mol), neopentyl glycol (76.4 g, 0.734 mol) and butyl stannoic acid (0.60 g) are charged into a 1-1 3-neck flask. The batch is heated under nitrogen to collect distillate using the following cook log.

190° C. for 2 hours
205° C. for 4 hours
220° C. for 10 hours
230° C. until the theoretical quantity of water is collected and the acid number is below 10.

The resin has the following properties:

I.V.=0.27
ICI Melt Viscosity at 200° C.=6 poise
Acid Number=1
Hydroxyl number=25
DSC (2nd cycle)
    $T_g$=−2° C.
    $T_{ch}$=15° C.
    $T_m$=100° C:$\Delta H_f$ 8.4 cal/g
GPC
    Mw=15,540
    Mn=5,727

EXAMPLE 3.b.

Powder Coating From Semi-Crystalline (Control) Polyester of Example 3.a.

Polyester 3.a (360 g), caprolactam blocked isophrone diisocyanate (Cargill 2400, 40 g), benzoin (2.9 g), dibutltin dilaurate (2.9 g), titanium dioxide (160 g) and flow control agent (8.0 g) are mixed and compounded in a Banbury mixer to a maximum temperature of 50° C. The compounded dough like mixture is cooled, ground and applied by a procedure similar to 1.b. The film properties are as follows:

Impact Strength (in.-lb)
    Front:>160
    Reverse:>160
Pencil Hardness:F
⅛ in. Conical Mandrel:Pass
Gloss
    60:89
    20:70
Zero-T Bend:Pass
Zero-T Bend, Dry Heat:Pass
Cake Test (Powder@40° C.):Pass

EXAMPLE 3.c.

Powder Coating From 20 Parts Semi-Crystalline Polyester of Example 3.a. and 80 Parts Amorphous Polyester X Polyester 3.a. (64.0 g), amorphous Polyester X (256.0 g), and caprolactam blocked isophorone diisocyanate (Cargill 2400, 80.0 g), benzoin (2.9 g), dibutyltin dilaurate (2.9 g), titanium dioxide (160 g) and flow control agent (8.0 g) are mixed, compounded, ground and coated as described in 2.b. The film properties are as follows:

Impact Strength (in.-lb)

Front:>160
Reverse:>160
Pencil Hardness:H
⅛ in. Conical Mandrel:Pass
Zero-T Bend:Pass
Zero-T Bend, Dry Heat@40° C.):Pass
Cake Test (Powder@40° C.):Pass Example 3 illustrates the synergistic effects of blending the amorphous and semi-crystalline polyesters to achieve a balance of hardness and flexibility.

EXAMPLE 4.c.

Powder Coating Composition Derived From 25 Parts of Polyester 1.a. and 75 Parts of Amorphous Polyester Y Polyester a.a. (249.0 g), Polyester Y (86.0 g) and 2,4-toluene diisocyanate (65.0 g), dibutyltin dilaurate (4.0 g), benzoin (2.0 g), flow control agent n(4.0), titanium dioxide (160 g) are mixed, ground and coated as described in 1.b. except the compounding is made in a Banbury mixer. The film has the following properties.
Impact Strength (in.-lb)
Front:>160
Reverse:>160
Pencil Hardness:2H
⅛ in. Conical Mandrel:Pass
Gloss
60:94
20:85
Zero-T Bend:Pass
Zero-T Bend, Dry Heat:Pass
Cake Test (Powder 169 40° C.):Pass Example 4.c. illustrates the synergistic effects of blendingn the amorphous and semi-crystalline polyesters to achieve a balance of hardness and flexibility.

EXAMPLE 5.a.

Semi-Crystalline Resin Synthesis

To a 5-1, 3-neck round bottom flask, dimethyl terephthalate (1296.8 g, 7.81 mol), neopentyl glycol (87.8 g, 0.84 mol), 1,6-hexanediol (896.4 g, 7.59 mol) and dibutyltin oxide (2.3 g) are added. The reaction procedure is similar to Example 1.a. The properties of the resin are as follows:
I.V.=0.27 dl/g
ICI Melt Viscosity at 200 ° C.=12 poise
Acid Number=12
DSC (2nd cycle)
Tg=9.8° C.
Tch=27.9° C.: Hcryst -6.3 cal/g
Tm=1323° C: ΔHf 9.8 cal/g
Cool Cycle
Tcc=91.7° C.: Hcryst 8.7 cal/g

EXAMPLE 5.b.

Powder Coating From Semi-Crystalline Polyester

Preparation of the powder coating is similar to 1.b. except Polyester 5.a. (332 g) and caprolactam blocked isopherone diisocyanate (68 g) are used. The properties of the cured coating area as follows:
Impact Strength (in.-lb)
Front:>160
Reverse:>160
Pencil Hardness:H
⅛ in. Conical Mandrel:Pass
Gloss
60:85
20:59
Zero-T Bend:Pass
Zero-T Bend, Dry Heat:Pass
Cake Test (Powder @40° C.):Pass

EXAMPLE 5.c.

Powder Coating From 40 Parts SemiCrystalline Polyester 5.a. and 60 parts of amorphous
Polyester Z. Preparation of this powder similar to Example 1.b. except Polyester Z (196.8 g), Polyester 5.a. (132.8 g) and caprolactam blocked isophorone diisocyanate (70.4 g) are added and that blending is done in a Banbury mixer. The properties of the coating are as follows:
Impact Strength (in.-lb)
Front:>160
Reverse:>160
Pencil Hardness:2H
⅛ in. Conical Mandrel:Pass
Gloss
60:89
20:69
Zero-T Bend:Pass
Zero-T Bend, Dry Heat:Pass
Cake Test (Powder@40° C.):Pass Examples 5.a., 5.b., and 5.c. illustrate the synergistic effects of blending amorphous Polyester Z with semi-crystalline polyester to achieve a balance of hardness and flexibility.

EXAMPLE 6.c.

Powder Coatings Derived from (Control) Polyester X

Polyester X (1600 g), a caprolactam blocked isopherone diisocyanate (400 g), benzoin (10 g), dibutyltin dilaurate (10.0 g), titanium dioxide (800 g) and flow control agent (20.0 g) are mixed, ground and coated as described in 1.b. The film has the following properties:
Impact Strength (in.-lb)
Front:>160
Reverse:>160
Pencil Hardness:2H
⅛ in. Conical Mandrel:Pass
Gloss
60:98
20:86
Zero-T Bend:Fail
Cake Test (Powder@40° C.):Pass Example 6.c. is a control example and illustrates that powder derived from amorphous Polyester X has good hardness and storage stability but fail the 'O-T' bend.

Unless otherwise specified, all parts, percentages, ratios, etc. are by weight.

The invention has been described in detail with particular reference to preferred embodiments thereof, but it will be understood that variations and modifications can be effected within the spirit and scope of the invention.

We claim:
1. Polyurethane powder coating composition in solid form comprising
(a) abou 10–80 weight % of at least one amorphous polyester containing free hydroxyl groups and having a Tg of greater than 40° C., a hydroxyl number of about 20-200, and an inherent viscosity of about 0.1-0.5.

(b) abou 10-80 weight % of at least one semi-crystalline polyester containing free hydroxyl groups and having a Tg of about −10 to about 50° C., a number average molecular weight of about 500-10,000, a heat of ofusion of greater than 5 calories per gram—° C., a hydroxyl number of about 20-200, an inherent viscosity of about 0.1-0.5, and (c) about 5-30 weight % of a polyisocyanate crosslinking agent.

the sum of (a), (b) and (c) being 100%.

2. A powder coating composition according to claim 1 wherein said amorphous polyester has a Tg of greater than 55° C., a hydroxyl number of about 30-80 and an inherent viscosity of about 0.15-0.30, and said semi-crystalline polyester has a Tg of abou −10 to about 30° C., a number average molecular weight of about 1000-6000, a melting point of about 80-120° C., a ΔHf of greater than 5 cal/g—°C., a hydroxyl number of about 30-80, and acid number of 20 or less and an I.V. of about 0.15-0.30.

3. A powder coating composition according to claim 1 wherein said semi-crystalline polyester has an acid component comprising terephthalic acid or 1,4-cyclohexanedicarboxylic acid, and a glycol component comprising 1,5-pentanediol, neopentyl glycol, 1,6-hexanediol, 1,10-decanediol, 1,12-dodecanediol or a combination of said glycols.

4. A powder coating composition according to claim 1 wherein a crosslinked coating of said composition has front and reverse impact strengths exceeding 160 in.-lb, is free-flowing after storage at 40° C. for 10 days and a flexibility such that no cracking or popping occurs when a panel is bent back on itself at 20,000 psi pressure, using no thickness between the two valves, either before or after heating said panel at 200° F. dry heat for 20 minutes.

5. The composition according to claim 1 which includes a catalytic amount of a catalyst for crosslinking said polyisocyanate and said polyesters.

6. The composition according to claim 1 in which said polyisocyanate is blocked.

7. The composition according to claim 1 which includes a colorant.

8. The composition according to claim 1 which includes a flow control aid and a pigment.

9. The composition according to claim 1 particulate form, in which the average particulate size is abou 10-125 microns.

10. The composition of claim 1 in particulate form in which the particles comprise an intimate mixture of the ingredients.

11. A substrate coated with the composition according to claim 1.

12. A powder coating composition according to claim 1 wherein said semi-crystalline polyester has an acid component comprising terephthalic acid or 1,4-cyclohexanedicarboxylic acid, and an glycol component consisting essentially of 1,5-pentanediol, neopentyl glycol, 1,10-decanediol, 1,12-dodecanediol or a combination of said glycols.

13. A powder coating composition according to claim 1 whrein said semi-crystalline polyester has an acid component comprising 1,4-cyclohexanedicarboxylic acid, and a glycol component comprising 1,5-pentanediol, neopentyl glycol, 1,6-hexanediool, 1,10-decanediol, 1,12-dodecanediol or a combination of said glycols.

* * * * *

UNITED STATES PATENT AND TRADEMARK OFFICE
CERTIFICATE OF CORRECTION

PATENT NO. : 4,859,760

DATED : August 22, 1989

INVENTOR(S) : Fred W. Light, Jr., James D. Hood, Yeong-Ho Chang

It is certified that error appears in the above-identified patent and that said Letters Patent is hereby corrected as shown below:

Column 10, line 66, Claim 1(a) "abou" should read --- about ---

Column 11, line 3, Claim 1(b) "abou" should read --- about ---

Column 11, line 7, Claim 1(b) "ofusion" should read --- fusion ---

Column 11, line 17, Claim 2 "abou" should read --- about ---

Column 12, line 14, Claim 9 "abou" should read --- about ---

Column 12, line 29, Claim 13 "whrein" should read --- wherein ---

Column 12, line 32, Claim 13 "1,6-hexanediool" should read --- 1,6-hexanediol ---

Signed and Sealed this

Nineteenth Day of June, 1990

*Attest:*

HARRY F. MANBECK, JR.

*Attesting Officer*   *Commissioner of Patents and Trademarks*